(12) United States Patent
Dang et al.

(10) Patent No.: US 10,415,433 B2
(45) Date of Patent: Sep. 17, 2019

(54) SYSTEMS AND METHODS FOR REDUCING THERMAL STRESS IN PRESSURE VESSELS

(71) Applicant: General Electric Company, Schenectady, NY (US)

(72) Inventors: Van Dang, Bloomfield, CT (US); Denis Robert Bruno, Granby, MA (US); Edward Martin Ortman, Winsted, CT (US); Early Femiana, Broad Brook, CT (US)

(73) Assignee: General Electric Company, Schenectady, NY (US)

( * ) Notice: Subject to any disclaimer, the term of this patent is extended or adjusted under 35 U.S.C. 154(b) by 322 days.

(21) Appl. No.: 15/376,392

(22) Filed: Dec. 12, 2016

(65) Prior Publication Data

US 2018/0163573 A1     Jun. 14, 2018

(51) Int. Cl.
    *F01K 23/10*        (2006.01)
(52) U.S. Cl.
    CPC .............. *F01K 23/10* (2013.01); *Y02E 20/16* (2013.01); *Y02E 20/18* (2013.01)
(58) Field of Classification Search
    CPC .......... F16L 41/08; F16L 41/082; F01K 23/10
    USPC ....................................................... 60/670
    See application file for complete search history.

(56) References Cited

U.S. PATENT DOCUMENTS

| | | | | |
|---|---|---|---|---|
| 7,770,544 | B2* | 8/2010 | Viskup, Jr. ............ | F22B 1/1815 122/235.19 |
| 2004/0262921 | A1* | 12/2004 | Watanabe ............ | F02M 55/005 285/354 |
| 2006/0061101 | A1* | 3/2006 | Bogdanowicz ......... | F16L 41/08 285/374 |
| 2006/0108444 | A1* | 5/2006 | Yeh ........................ | F16L 41/08 239/204 |
| 2015/0239198 | A1* | 8/2015 | Iwata ...................... | F16L 23/12 138/109 |
| 2016/0290233 | A1* | 10/2016 | Ekanayake ............. | F01K 23/02 |
| 2016/0290235 | A1* | 10/2016 | Ekanayake ............. | F01D 5/181 |
| 2016/0305650 | A1* | 10/2016 | Magee .................. | F22B 1/1815 |
| 2017/0350357 | A1* | 12/2017 | Touchette ............. | F16L 19/025 |

* cited by examiner

*Primary Examiner* — Jason D Shanske
(74) *Attorney, Agent, or Firm* — Fletcher Yoder, P.C.

(57) ABSTRACT

A system includes a heat recovery steam generator (HRSG) configured to generate steam from a supply of feed water using exhaust gases. The HRSG includes a heater configured to receive a supply of steam and further heat the steam. The heater includes a first manifold and a first set of branch connections circumferentially spaced about a first circumferential axis of the first manifold. Each of the branch connections routes a fluid jet of steam into a lumen of the first manifold.

20 Claims, 5 Drawing Sheets

SYSTEMS AND METHODS FOR REDUCING THERMAL STRESS IN PRESSURE VESSELS

BACKGROUND

The subject matter disclosed herein relates to heat recovery steam generation (HRSG) systems. More specifically, the present disclosure relates to systems and methods for reducing thermal stress in pressure vessels found within HRSG systems.

Certain power plants include a combined cycle. The combined cycle may enable greater energy efficiencies, for example, by capturing energy that would have normally been lost through exhaust heat. Accordingly, a combined cycle may include systems that transform energy from exhaust heat into useful power. For example, combined cycle power generation systems may include HRSG systems that use gas turbine engine exhaust to generate steam for a steam turbine. Specifically, HRSG systems may heat a fluid flowing through heat exchangers in the HRSG to produce steam, and the steam may be used for high-pressure, intermediate-pressure, and/or low-pressure sections of a steam turbine. In some situations, the HRSG may intake water, convert the water into steam, and further heat the steam using a series of heaters. The heaters may include manifolds, which may be pressure vessels.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In a first embodiment, a system includes a heat recovery steam generator (HRSG) configured to generate steam from a supply of feed water using exhaust gases. The HRSG includes a heater configured to receive a supply of steam and further heat the steam. The heater includes a first manifold and a first set of branch connections circumferentially spaced about a first circumferential axis of the first manifold. Each of the branch connections routes a fluid jet of steam into a lumen of the first manifold.

In a second embodiment, a system includes a heat recovery steam generator (HRSG) configured to generate steam from a supply of feed water using exhaust gases. The HRSG includes a heater configured to receive a supply of steam and further heat the steam. The heater includes a manifold and multiple branch connections spaced about a circumferential axis of the manifold and spaced along a length of the manifold, wherein each branch connection routes a fluid jet of steam into a lumen of the manifold.

In a third embodiment, a system includes a gas turbine engine configured to produce exhaust gases and a heat recovery steam generator (HRSG) configured to receive the exhaust gases from the gas turbine engine, wherein the exhaust gases are used to generate steam from a supply of feed water. The HRSG includes a heater configured to receive a supply of steam and further heat the steam. The heater includes a manifold and multiple branch connections circumferentially spaced about a circumferential axis of the manifold, wherein each branch connection routes a fluid jet of steam into a lumen of the manifold. The system further includes a steam turbine configured to receive the supply of steam from the heater to drive a load.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
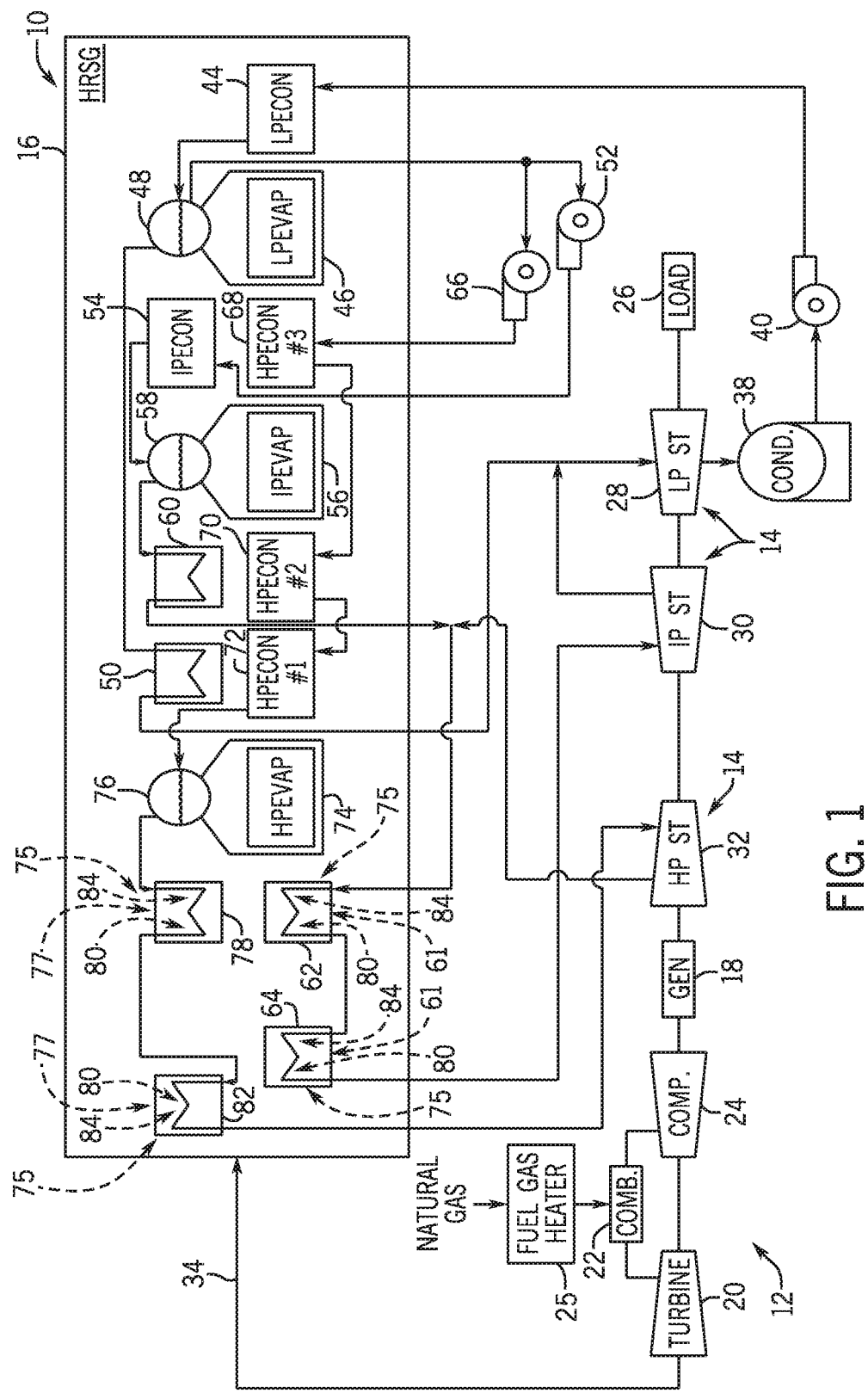
FIG. 1 is schematic flow diagram of an embodiment of a combined cycle system having a heat recovery steam generator (HRSG) system, in accordance with an embodiment of the present disclosure.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include a heat recovery steam generator (HRSG) that may be utilized with a combined cycle system such as, but not limited to, a combined cycle power plant (CCPP) or an integrated gasification combined cycle (IGCC) power plant. The HRSG includes various components that enable steam production using exhaust gas from a gas turbine engine. The steam produced by the HRSG may be used to drive a load associated with a steam turbine. The HRSG system may include one or more pressure sections (e.g., high-pressure (HP), intermediate-pressure (IP), and low-pressure (LP)) that each includes a steam drum, an evaporator, and an economizer. Specifically, as further discussed in detail below, feed water may be routed through the pressure sections, and may be converted to steam. In certain situations, high-pressure steam exiting the HP section of the HRSG may be directed into one or more heaters, including superheaters (e.g., a primary high-pressure superheater, a finishing high-pressure superheater, etc.) and reheaters (e.g., a primary reheater, a secondary reheater, etc.). The heaters may superheat the HP steam, and eventually route the HP steam into a HP and/or IP stages of the steam turbine.

In particular, the disclosed embodiments are generally related to a configuration for pressure vessels of heaters (e.g., superheaters and reheaters) that may help reduce thermal stress and improve cyclic operations within HRSG systems. Specifically, the disclosed embodiments are related to a configuration or arrangement of components of the heaters (e.g., superheaters and reheaters) that help reduce thermal stresses and improve cyclic operations for the heaters. For example, in certain embodiments of the present disclosure, a configuration of the manifold of the heater and/or one or more branch connections (e.g., link pipes) coupled to the manifold, may be altered in a manner that helps reduce thermal stress resulting from HRSG operations. In particular, the geometry, dimensions, and/or arrangement of the one or more branch connections coupled to the manifold may be altered to reduce thermal stress and improve cyclic operations. In certain embodiments, for example, the circumferential distribution of the plurality of branch connections around the manifold may be arranged to improve efficiency and promote uniform temperature distribution. In particular, in certain embodiments, the branch connections may be symmetrically and evenly spaced along a circumferential axis and along the length of the manifold, which may enable reduced thermal interactions among the branch connections and overall stress on the manifold. Further, in certain embodiments, each branch connection of the plurality of branch connections may be reinforced, such that the thickness of the walls of the reinforced connections are similar in thickness to the walls of the manifold. In this manner, the thickness of the walls of the manifold may be minimized, thereby reducing thermal stress on the manifold. Further still, in certain embodiments, the angle at which each branch connection is coupled to the manifold may be arranged such that the fluid jets of steam from each branch connection interact and impinge fluid jets of steam from other branch connections.

Turning now to the drawings, FIG. 1 is a schematic flow diagram of an embodiment of a combined cycle power generation system 10 having a gas turbine 12, a steam turbine 14, and an HRSG system 16. The system 10 may include the gas turbine 12 for driving a generator 18 (e.g., a load). The generator 18 may, for instance, be an electrical generator for producing electrical power. Further, the gas turbine 12 may include a turbine 20, a combustor or combustion chamber 22, and a compressor 24. In certain embodiments, the combustion chamber 22 may receive natural gas and/or liquid fuel from a fuel gas heater 25 coupled to the combustion chamber 22. In one embodiment, the system 10 may also include the steam turbine 14 for driving a load 26. The load 26 may also be an electrical generator for generating electrical power. However, both the generator 18 and the load 26 may be other types of loads capable of being driven by the gas turbine 12 and steam turbine 14. In addition, although the gas turbine 12 and steam turbine 14 appear to be utilized in tandem to drive the generator 18 and the load 26 together on a single shaft, as shown in the illustrated embodiment, the gas turbine 12 and the steam turbine 14 may also be used to drive the generator 18 and the load 26 on separate shafts. However, the specific configuration of the steam turbine 14, as well as the gas turbine 12, may be implementation-specific and may include any combination of sections.

The system 10 may also include the multi-stage HRSG 16. The components of the HRSG 16, in the illustrated embodiment, are a simplified depiction of the HRSG 16 and are not intended to limit what may be included in the HRSG 16. Rather, the illustrated HRSG 16 is shown to convey the general operation of HRSG systems. Further, the HRSG 16 may be provided as a single stage HRSG 16 or as any other type of HRSG. Heated exhaust gas 34 from the gas turbine 12 may be transported into the HRSG 16 and used to heat steam for use in powering the steam turbine 14. As may be appreciated, the temperature of the exhaust gas 34 may vary based on a number of variables including fuel composition, ambient conditions, and/or the operating conditions of the gas turbine 12. For example, the temperature of the exhaust gas 34 may vary within a range of approximately 300 to 750° C. during typical operation.

In combined cycle systems such as system 10, hot exhaust gas 34 may flow from the gas turbine 12 and pass through the HRSG 16 and may be used to generate steam at one or more pressure levels and at high temperatures. The steam produced by the HRSG 16 may then be passed through the steam turbine 14 for power generation. In addition, the produced steam may be supplied to any other processes where superheated/saturated steam may be used. The gas turbine 12 cycle is often referred to as the "topping cycle," or Brayton cycle, whereas the steam turbine 14 generation cycle (e.g., steam cycle) is often referred to as the "bottoming cycle" or Rankine cycle. By combining these two cycles as illustrated in FIG. 1, the combined cycle power generation system 10 may lead to greater overall efficiency for the combined plant. In particular, exhaust heat from the topping cycle may be captured and used to generate steam for use in the bottoming cycle.

In the illustrated embodiment, the steam turbine 14 may include a low-pressure section 28 (LP ST), an intermediate-pressure section 30 (IP ST), and a high-pressure section 32 (HP ST). As may be appreciated, each of the pressure sections 28, 30, and 32 may produce exhaust. Exhaust from the low-pressure section 28 of the steam turbine 14 may be directed into a condenser 38, where the exhaust is condensed into a liquid condensate. The condensate from the condenser 38 may, in turn, be directed toward the low-pressure section of the HRSG 16 with the aid of a condensate pump 40. Further, the condensate may then flow through a low-pressure economizer 44 (LPECON), which is used to heat the condensate. From the low-pressure economizer 44, the condensate may be directed into a low-pressure evaporator 46 (LPEVAP) having a pressure vessel 48 (e.g., boiler) used to produce steam from the condensate. Steam produced from the low-pressure evaporator 46 may flow through a low-pressure superheater 50, where the steam is superheated and then directed to the low-pressure section 28 of the steam turbine 14.

Returning to the pressure vessel 48, heated condensate may be pumped from the pressure vessel 48 through an intermediate-pressure pump 52 toward an intermediate-pressure economizer 54 (IPECON) for applying addition heat to the condensate. From the intermediate-pressure economizer 54, the condensate may be directed into an intermediate-pressure evaporator 56 (IPEVAP) having a pressure vessel 58 (e.g., boiler) used to produce steam from the condensate. Steam from the intermediate-pressure evaporator 56 may be directed to an intermediate-pressure superheater 60, where the steam is superheated. The superheated steam may then flow through one or more reheaters 61 before being directed to the intermediate-pressure section 30 of the steam turbine 14. For example, the reheaters 61 may include a primary reheater 62 and a secondary reheater 64. As illustrated, exhaust from the intermediate-pressure section 30 of the steam turbine 14 may be directed into the low-pressure section 28 of the steam turbine 14.

Returning again to the pressure vessel 48, heated condensate may be pumped from the pressure vessel 48 through a high-pressure pump 66 toward a third high-pressure economizer 68 (HPECON #3) for applying additional heat to the condensate. Condensate from the third high-pressure economizer 68 may be directed to a second high-pressure economizer 70 (HPECON #2) then to a first high-pressure economizer 72 (HPECON #1) where the condensate is further heated. Condensate from the first high-pressure economizer 72 may be directed into a high-pressure evaporator 74 (HPEVAP) having a pressure vessel 76 (e.g., boiler) used to produce steam from the condensate. Steam exiting the high-pressure evaporator 74 may be directed into one or more high-pressure superheaters 77. For example, in the illustrated embodiment, the high-pressure superheaters 77 may include a primary high-pressure superheater 78 and a finishing high-pressure superheater 82. The high-pressure superheaters 77 may superheat the steam and eventually route the high-pressure steam to the high-pressure section 32 of the steam turbine 14. As illustrated, exhaust from the high-pressure section 32 of the steam turbine 14 may, in turn, be directed through the primary and secondary reheaters 62 and 64 and into the intermediate-pressure section 30 of the steam turbine 14.

Steam directed into the heaters 75 (e.g., high-pressure superheaters 77 and reheaters 61) from the high-pressure evaporator 74 and the high-pressure section 32 of the steam turbine 14 may pass through one or more manifolds 80 in the heaters 75. During operation of the HRSG 16, the heaters 75 may heat the steam to approximately 600° C. and generate dry hot steam, which is then routed into the high-pressure section 32 or the intermediate-pressure section 30 of the steam turbine 14. In certain embodiments, each heater 75 may include a manifold 80, which may be configured to couple to a plurality of branch connections 84 (illustrated in FIG. 2). Specifically, the branch connections may be a plurality of link pipes (e.g., a plurality of smaller lines or branches) arranged along the length of the manifold 80, and collected by the manifold 80 into a larger main vessel in order to aggregate the flow of the smaller lines. In certain embodiments, it may be beneficial to vary the arrangement, geometry, and/or structure of the plurality of branch connections 84 coupled to the manifold 80, in order to reduce thermal stresses, improve cyclic operations, promote uniform temperature distribution throughout the heaters 75 (e.g., high-pressure superheaters 77 and reheaters 61), and/or reduce a rate of heat transfer to the walls of the heaters 75 by encouraging fluid jets of steam from each branch connection 84 to impinge upon one another within the manifold 80 to generate a swirling flow. These and other features are further described in detail with respect to FIGS. 2-5.

Figure 2:
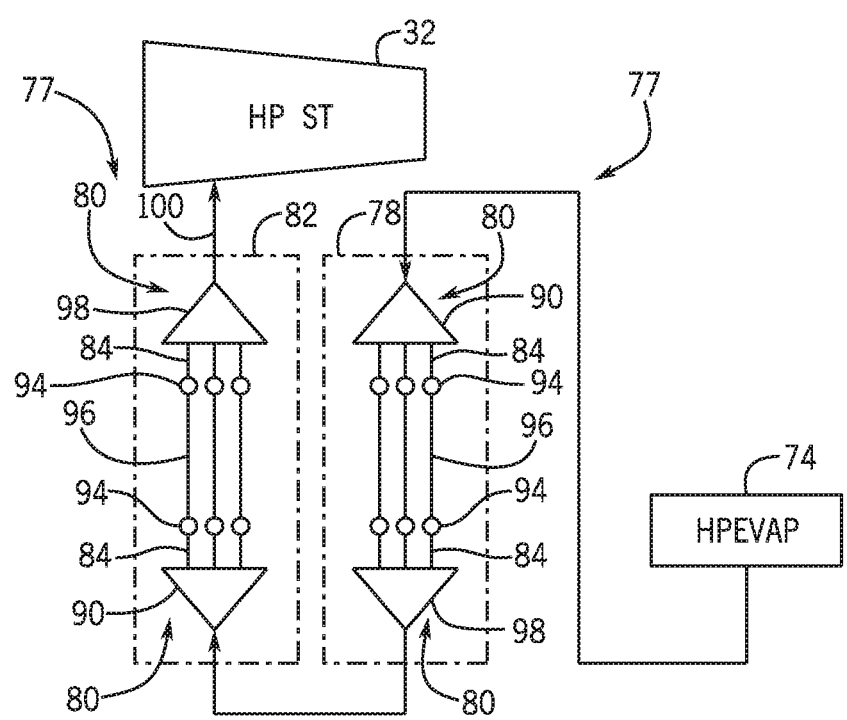
FIG. 2 is a schematic flow diagram of an embodiment of the HRSG system of FIG. 1, where the HRSG system includes one or more high-pressure heaters, in accordance with an embodiment of the present disclosure.

FIG. 2 is a schematic flow diagram of an embodiment of the high-pressure superheaters 77 of the HRSG 16 of FIG. 1. This example discusses use of the manifold 80 with respect to the high-pressure superheaters 77 of the HSRG 16, however it should be understood that the disclosed embodiment may be applied to the reheaters 61 (e.g., primary reheater 62 and secondary reheater 64) of the HRSG 16 as well. In certain embodiments, steam exiting the high-pressure evaporator 74 may be directed into one or more high-pressure superheaters 77 that are arranged in a series configuration. The superheaters 77 may be configured to superheat the steam to generate a dry hot steam, which may be routed to the high-pressure section 32 of the steam turbine 14. In the illustrated embodiment, the steam is routed into the primary high-pressure superheater 78 and the finishing high-pressure superheater 82. In particular, each superheater 77 may include a manifold 80 (e.g., high-pressure manifold 80), such as, for example, an inlet manifold 90 and an outlet manifold 98. In certain embodiments, each manifold 80 may be configured to aggregate one or more branch connections 84 (e.g., link pipes) in a particular arrangement or configuration around and along the length of the manifolds 80, as further described with respect to FIG. 3.

In the illustrated embodiment, the steam from high-pressure evaporator 74 may first be routed into the primary high-pressure superheater 78, and then into the finishing high-pressure superheater 82. In other embodiments, it should be noted that additional superheaters 77 may be arranged in series with the primary and finishing high-pressure superheaters 78, 82. For each superheater 77, the steam may enter and exit through the manifold 80, such as enter through the inlet manifold 90 and exit through the outlet manifold 98. For example, steam may enter the inlet manifold 90 of the primary high-pressure superheater 78, be routed through the plurality of branch connections 84 of the primary high-pressure superheater 78, and may exit through the outlet manifold 98 of the primary high-pressure superheater 78. Similarly, the steam may enter the inlet manifold 90 of the finishing high-pressure superheater 82 (from the outlet manifold 98 of the primary high-pressure superheater 78), be routed through the plurality of branch connections 84 of the finishing high-pressure superheater 82, and may exit through the outlet manifold 98 of the finishing high-pressure superheater 82.

In certain embodiments, each branch connection 84 may be reinforced at the location where the branch connection 84 is coupled to the manifold 80 (i.e., inlet manifold 90 and outlet manifold 98 of the superheaters 77). The branch connections 84 may then connect to one or more headers 94 disposed near the manifold 80. The steam may enter or exit the one or more headers 94 from the branch connections 84. Each header 94 may connect to twelve branch connections 84, however there may be any number of branch connections 84 (e.g., 6, 8, 10, 14, 16, 18, 20, 22, 24, 30, 50, or more) for each header 94. In the illustrated embodiment, three headers 94 are depicted near the manifolds 80 (e.g., inlet manifold 90 and outlet manifold 98) of each superheater 77. In other embodiments, any number of headers 94 (e.g., 2, 4, 5, 6, 7, or more) may be disposed near the manifolds 80 of each superheater 77.

In certain embodiments, the steam may enter a plurality of steam tubes 96 from the one or more headers 94 at the inlet manifold 90 of each superheater 77. In certain embodiments, each header 94 may include fifty steam tubes 96, however there may be any number of steam tubes 96 (e.g., 10, 20, 30, 40, 50, 60, 70, 80, or more) per header 94. Further, the steam from the steam tubes 96 may then enter the headers 94 near the outlet manifold 98 of each superheater 77. In certain embodiments, the steam from the headers 94 near the outlet manifold 98 may enter the branch connections 84 that lead the steam to the outlet manifold 98 of each superheater 77. For example, there may be twelve branch connections 84 exiting each of the headers 94 towards the outlet manifold 98 of each superheater 77. However, any number of branch connections 84 may be utilized to route the steam from each header 94 and into the outlet manifold 98. In certain embodiments, the steam may exit the finishing high-pressure superheater 82 via a steam pipe 100 coupled to the outlet manifold 98. In particular, the steam pipe 100 may take the produced hot steam from the finishing high-pressure superheater 82 to the high-pressure section 32 of the steam turbine 14. In certain embodiments, the produced steam may be supplied to any other processes where superheated steam may be used.

In certain embodiments, there may be a manifold 80 at the outlet manifold 98 of each superheater 77. There may also be a manifold 80 at the inlet manifold 90 of each superheater 77. The inlet manifold 90 of each superheater 77 may be a mirror image of the outlet manifold 98 of each superheater 77. The one or more manifolds 80 of the superheaters 77 may be configured to couple to multiple branch connections 84 via reinforced connections 110 (illustrated in FIG. 3). In certain embodiments, the branch connections 84 may couple to the one or more manifolds 80 in a circumferential arrangement around the manifolds 80 and may be distributed along a length 120 (illustrated in FIG. 3) of the manifolds 80. In certain embodiments, the branch connections 84 may be reinforced at the junction (the reinforced connection 110) between the branch connections 84 and the manifold 80.

Figure 3:
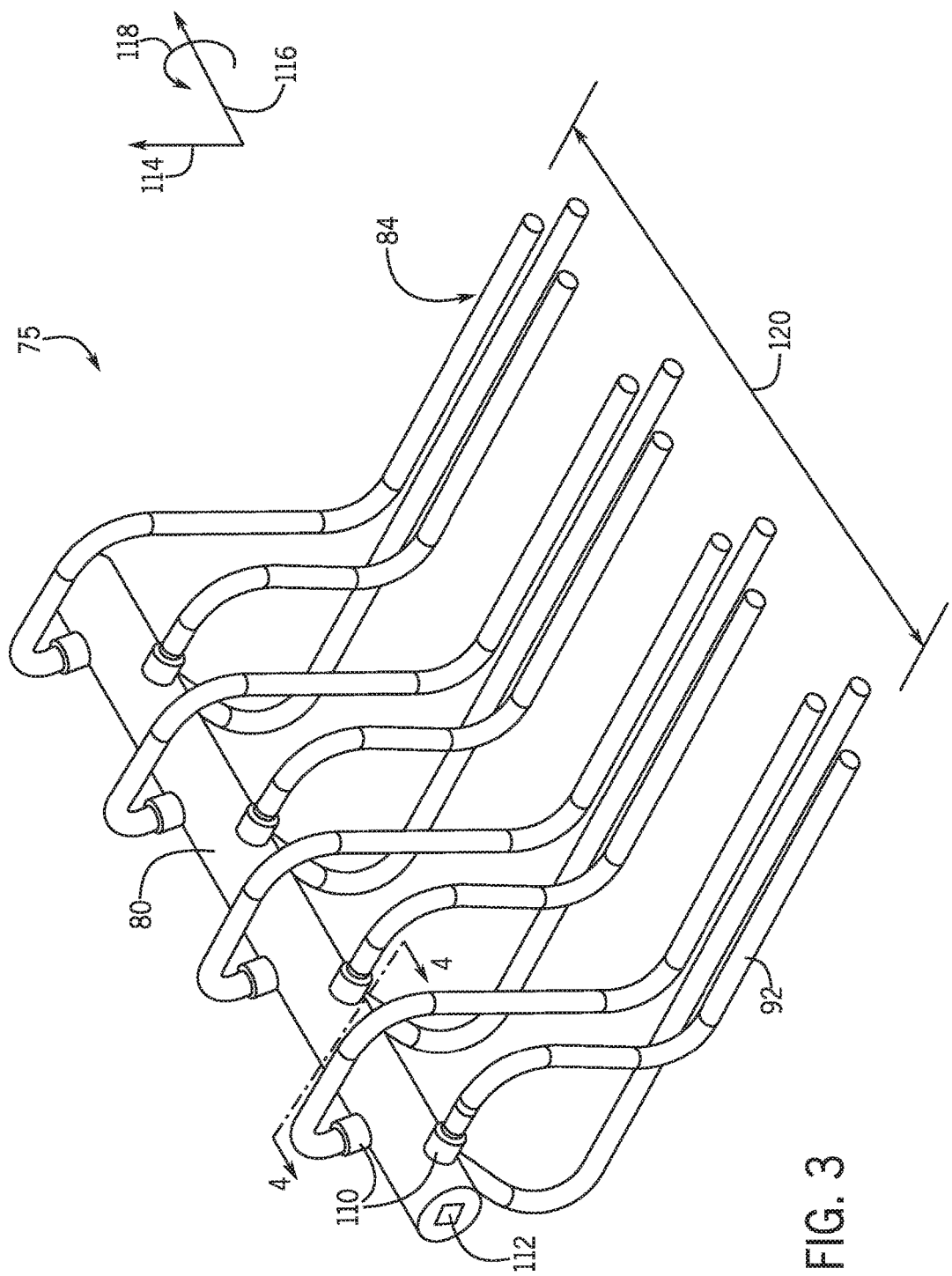
FIG. 3 is a perspective view of an embodiment of the high-pressure heaters of FIG. 2, where the high-pressure heaters include a manifold, in accordance with an embodiment of the present disclosure.

FIG. 3 is a perspective view of a portion of a manifold 80, such as the inlet manifold 90 and/or the outlet manifold 98 of a heater 75 within the HRSG system 16. In the illustrated embodiment, the manifold 80 may have an annular structure with a lumen 112, and the steam may travel through a length 120 of the manifold 80. In particular, each branch connection 84 may route steam into the lumen 112 (as a fluid jet of steam) through the wall of the manifold 80, such that the steam from each branch connection 84 is incorporated into the steam running through the lumen 112. In certain embodiments, the branch connections 84 may also have an annular structure. The branch connections 84 may run parallel to each other as the branch connections 84 exit the headers 94 and approach the manifold 80. However, the branch connections 84 may change directions as they approach the manifold 80, such that each branch connection 84 couples to the manifold 80 in a circumferential arrangement around the circumferential axis 118 and along the longitudinal axis 116 of the manifold 80.

Figure 4:
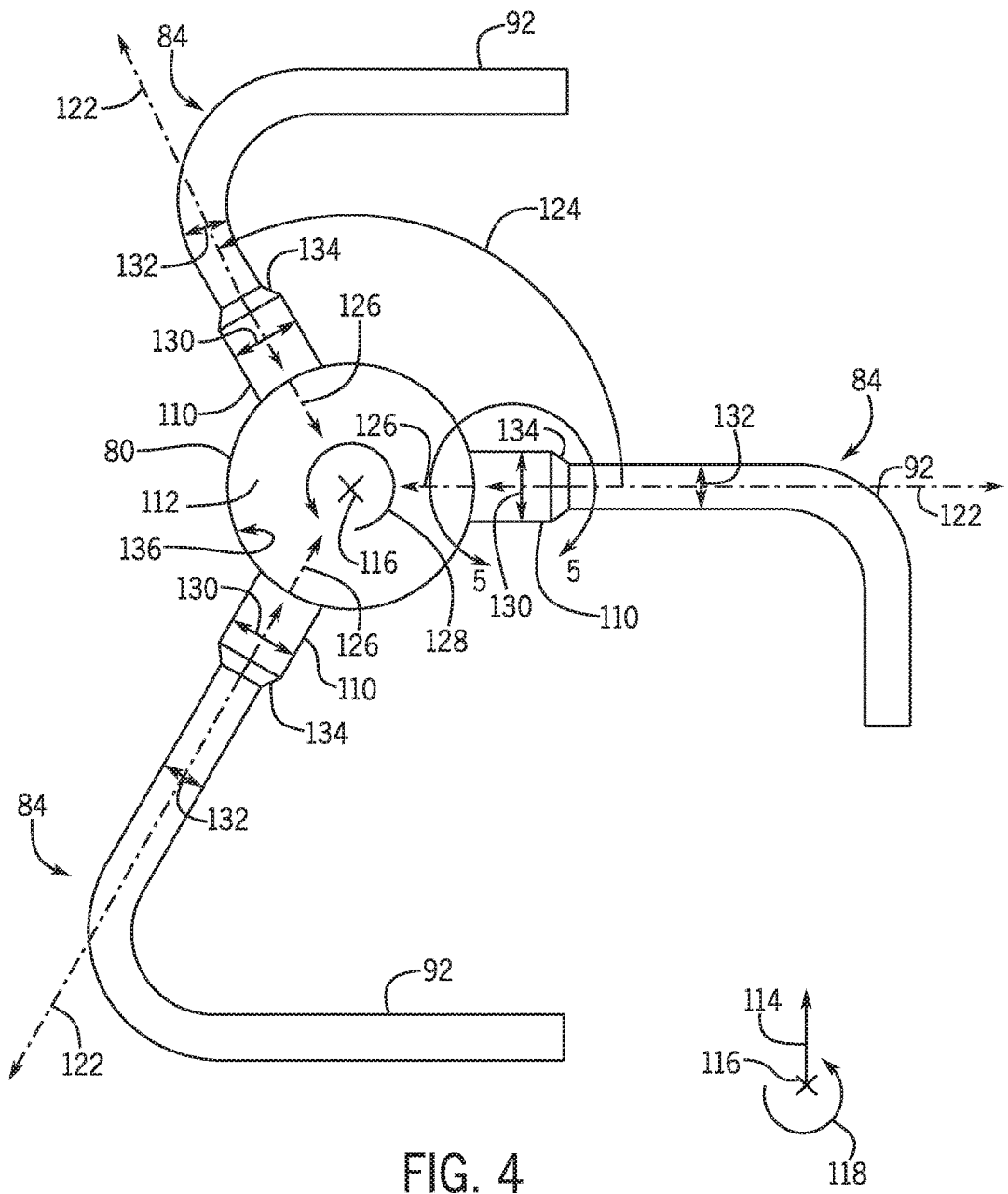
FIG. 4 is a cross-sectional view of an embodiment of the manifold of the high-pressure heater of FIG. 3, in accordance with an embodiment of the present disclosure.
Figure 5:
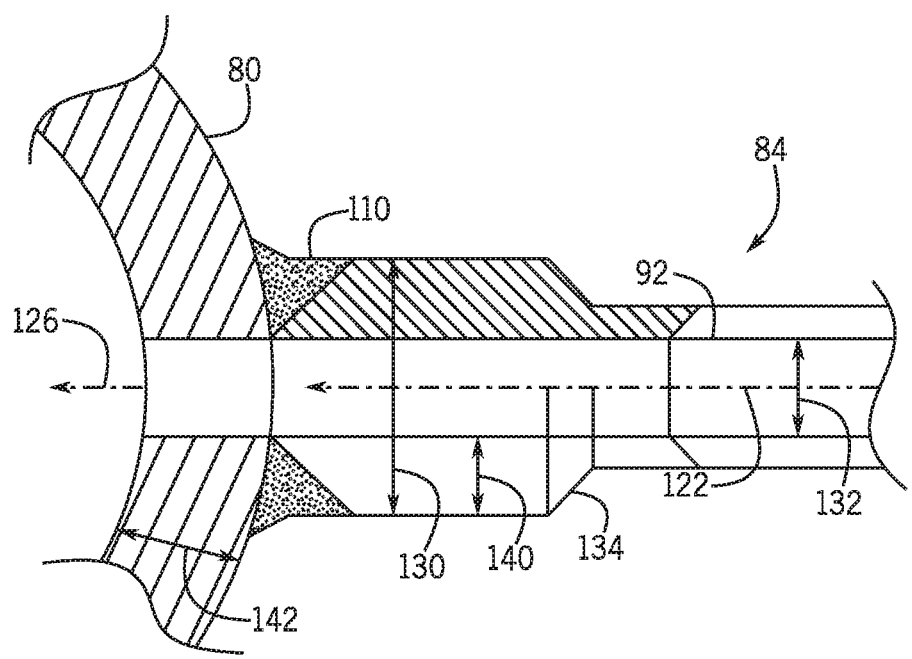
FIG. 5 is a detailed cross-sectional view of an embodiment of a reinforced connection of the manifold of FIG. 4, in accordance with an embodiment of the present disclosure.

In certain embodiment, the branch connections 84 may each have a pipe section 92 and a reinforced connection 110, as further described with respect to FIGS. 4 and 5. The multiple branch connections 84 that enter from, or exit to, the headers 94 may couple to the manifold 80 via reinforced connections 110. In certain embodiments, the reinforced connections 110 that couple the branch connections 84 to the manifold 80 may be evenly distributed circumferentially about the circumferential axis 118 of the manifold 80, and evenly distributed along the length 120 of the longitudinal axis 116 of the manifold 80. This distribution configuration may enable the branch connections 84 to couple to the manifold 80 in a symmetrical manner, thereby enabling a uniform distribution of heat as the steam from each branch connection 84 enters the lumen 112 of the manifold 80. In certain embodiments, the even distribution of heat may help reduce stress on the manifold 80, at least in part because there is not a concentration of heat at a particular location or along a particular wall of the manifold 80. However, in certain embodiments, the branch connections 84 may couple to the manifold 80 in an asymmetrical manner. For example, in certain embodiments, the reinforced connections 110 that couple the branch connections 84 to the manifold 80 may be unevenly or randomly distributed circumferentially about the circumferential axis 118 of the manifold 80, and unevenly or randomly distributed along the length 120 of the longitudinal axis 116 of the manifold 80

In the illustrated embodiment, the branch connections 84 are coupled to the manifold 80 via the reinforced connections 110 in three staggered rows along a longitudinal axis 116 of the manifold 80. However, the branch connections 84 and reinforced connections 110 may be oriented in any other arrangement along the length of the manifold 80. These and other features of the branch connections are further described with respect to FIGS. 4 and 5.

FIG. 4 a cross-sectional view of an embodiment of the manifold 80, such as the inlet manifold 90 and/or the outlet manifold 98 of a heater 75 (e.g., superheaters 77 and reheaters 61) within the HRSG system 16. In the illustrated embodiment, three branch connections 84 may be coupled to the manifold 80. In particular, at a particular longitudinal position along the length 120 of the manifold, the branch connections 84 may be evenly distributed about the circumferential axis 118 of the manifold 80. For example, the angle of separation between each branch connection 84 at a particular longitudinal position on the manifold may be the same. Further, the even distribution about the circumferential axis 118 may repeated at different longitudinal positions along the length 120 of the manifold. For example, groups of three circumferentially evenly spaced branch connections 84 may be evenly distributed along the length 120 of the manifold 80. In this manner, the branch connections 84 may be arranged in three rows running parallel to each other along the length 120 of the manifold 80 (as illustrated in FIG. 3).

In certain embodiments, the branch connections 84 coupled to the manifold 80 via the reinforced connections 110 may be arranged in such a manner along and about manifold 80 such that the fluid jets of steam 126 from the separate branch connections 84 may impinge each other as the fluid jets of steam 126 enter the manifold 80. This interaction of the fluid jets of steam 126 from the branch connections 84 may cause a swirling flow 128 of the steam collected inside of the manifold 80. Accordingly, arranging the branch connections 84 in this manner may allow the fluid jets of steam 126 from the branch connections 84 to impinge upon each other rather than directly contacting the inner surface 136 of the manifold 80. Further, a swirling flow 128 of steam inside the manifold 80 may help reduce stress on the inner chamber (lumen 112) and inner walls 136 of the manifold 80. In certain embodiments, the branch connections 84 may be arranged in a staggered arrangement such that the fluid jets of steam 126 entering the manifold 80 may not directly interact with each other. The fluid jets of steam 126 entering into the manifold 80 may generate a swirling flow 128 due to the flows 126 entering at multiple locations along the length 120 of the manifold 80. The fluid jets of steam 126 may then interact with the swirling flow 128 as they enter and may help reduce stress on the manifold 80.

In the illustrated embodiment, the branch connections 84 may each include an axis 122 that runs along the length of the reinforcement connection 110 of each branch connection 84. The axis 122 of each reinforcement connection 110 may be perpendicular to the longitudinal axis 116 of the manifold 80. In certain embodiments, the spacing between each branch connection 84 circumferentially spaced (about the circumferential axis 118) around the manifold 80 may be at an angle of 120° from the axis 122 of one branch connection 84 to the axis 122 of the neighboring branch connection 84. This angle may be more or less than 120° depending on the number of the branch connections 84 coupled to the manifold 80 and the number of rows of branch connections 84 arranged along the length 120 of the manifold 80. It should be understood that there may be any number of the branch connections 84 coupled to the manifold 80 and the branch connections 84 may be in a variety of arrangements about and along the manifold 80. For example, in certain embodiments, the branch connections 84 may be circumferentially randomly or unevenly distributed at a particular longitudinal position along the length 120 of the manifold 80. Further, the branch connections 84 may be randomly or unevenly distributed along the length 120 of the manifold.

In certain embodiments, each of the pipe sections 92 of the branch connections 84 may have a diameter 132. Each of the reinforced connections 110 of the branch connections 84 may have a diameter 130. In certain embodiments, the diameter 130 of the reinforced connections 110 may be greater than the diameter 132 of the branch connections 84. Further, the branch connections 84 may have a tapered edge 134 at the location where the diameter 132 of the pipe sections 92 of the branch connections 84 increases to the diameter 130 of the reinforced connections 110. In certain embodiments, the diameter of the lumen of the branch connections 84 and the diameter of the lumen of the reinforced connections 110 may be the same. Accordingly, a greater diameter 130 compared to the diameter 132 may indicate that the walls of the reinforced connections 110 may be thicker than the walls of the pipe sections 92 of the branch connections 84. The thickness of the walls of the reinforced connections 110 will be discussed in greater detail with reference to FIG. 5.

FIG. 5 is a detailed cross-sectional view of the reinforced connections 110 of the branch connections 84 disposed in the heaters 75 (e.g., superheaters 77 and reheaters 61). The detailed view illustrates that the diameter 132 of the pipe sections 92 of the branch connections 84 may be less than the diameter 130 of the reinforced connections 110. The tapered edge 134 of the branch connections 84 may increase outwardly from the diameter 132 to the diameter 130 as the pipe sections 92 of the branch connections 84 are coupled to the reinforced connections 110. In certain embodiments, the tapered edge 134 may include one or more steps to gradually increase the diameter from the pipe sections 92 to the reinforced connections 110. In the illustrated embodiment, there may be a first thickness 140 of the reinforced connections 110, which may enable the lumen of the pipe sections 92 to be the same as the lumen of the reinforced connection 110. There may also be a second thickness 142 of the walls of the manifold 80. The first thickness 140 may be similar to the second thickness 142, indicating a similar thickness of the walls of the reinforced connections 110 and the walls of the manifold 80. The similarity in thicknesses (first and second thicknesses 140 and 142) of the walls of the reinforced connections 110 and the manifold 80 may help reduce pressure on the manifold 80 without increasing the thickness 142 of the wall of the manifold 80. In this manner, having reinforced connections 110 with thickened walls thereby strengthens the manifold 80, and may enable thinning the walls of the manifold 80, thus reducing thermal stress on the manifold 80.

Technical effects of the disclosed embodiments include helping reduce stress placed on the one or more manifolds in the high-pressure superheaters and reheaters of the HRSG, as well as improving cyclic operations of the manifolds. Fluid jets of steam entering the manifold from the branch connections may cause thermal stress on the manifold, as the steam in the superheaters may be heated up to 600° C. or more. Reinforced connections having walls with a thickness similar to the thickness of the walls of the manifold may enable making the walls of the manifold thinner. Thinner walls of the manifold may enable the manifold to be more fatigue tolerant, thereby improving cycling capability of the manifold. Moreover, the circumferential arrangement of the coupling of the branch connections about and along the length of the manifold may further help reduce stress on the manifold as the fluid jets of steam collect in the manifold. An evenly spaced and circumferential distribution of the fluid jets of steam entering into the manifold may enable the fluid jets of steam to impinge each other, rather than the walls of the manifold.

This written description uses examples to disclose the concepts discussed herein, including the best mode, and also sufficient disclosure to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
a heat recovery steam generator (HRSG) configured to generate steam from a supply of feed water using exhaust gases, wherein the HRSG comprises:
a heater configured to receive a supply of steam and further heat the steam, wherein the heater comprises a first manifold and a first plurality of branch connections, the first plurality of branch connections comprises at least three branch connections, the first manifold comprises a first wall disposed about an entire first circumference that extends fully around a first central axis of the first manifold, the first plurality of branch connections is circumferentially spaced evenly about the entire first circumference of the first manifold, and each branch connection of the first plurality of branch connections routes a fluid jet of steam into a lumen of the first manifold.

2. The system of claim 1, wherein the heater comprises a second manifold and a second plurality of branch connections, the second plurality of branch connections comprises at least three branch connections, the second manifold comprises a second wall disposed about an entire second circumference that extends fully around a second central axis of the second manifold, the second plurality of branch connections is circumferentially spaced evenly about the entire second circumference of the second manifold, and each branch connection of the second plurality of branch connections routes a fluid jet of steam out of the second manifold.

3. The system of claim 2, wherein the first manifold and the first plurality of branch connections are fluidly coupled to the second manifold and the second plurality of branch connections via a plurality of steam tubes.

4. The system of claim 1, wherein each branch connection of the first plurality of branch connections comprises a pipe section fixedly coupled to a reinforced connection, and wherein each branch connection of the first plurality of branch connections is fixedly coupled to the first manifold with the reinforced connection.

5. The system of claim 4, wherein a first inner diameter of the reinforced connection is of the same dimension as a second inner diameter of the pipe section, and a first outer diameter of the reinforced connection is greater than a second outer diameter of the pipe section.

6. The system of claim 4, wherein a first wall thickness of the reinforced connection is at least greater than half of a second wall thickness of the first manifold.

7. The system of claim 4, wherein each branch connection of the first plurality of branch connections comprises a tapered edge between the pipe section and the reinforced connection.

8. The system of claim 1, wherein the first plurality of branch connections are symmetrically and evenly spaced about the first circumferential axis of the first manifold.

9. The system of claim 1, wherein the first plurality of branch connections are evenly spaced along a length of the first manifold.

10. The system of claim 1, wherein a first branch connection of the first plurality of branch connections routes a first fluid jet of steam into the lumen of the first manifold at a first angle, and wherein a second branch connection of the first plurality of branch connections routes a second fluid jet of steam into the lumen of the first manifold at a second angle different from the first angle.

11. The system of claim 10, wherein the first fluid jet of steam and the second fluid jet of steam impinge one another within the lumen to generate a swirling flow through the first manifold.

12. The system of claim 1, wherein the HRSG routes the supply of steam into a steam turbine of a combined cycle system.

13. A system, comprising:
a heat recovery steam generator (HRSG) configured to generate steam from a supply of feed water using exhaust gases, wherein the HRSG comprises:
a heater comprising a manifold and a plurality of branch connections, wherein the plurality of branch connections comprises at least three branch connections, the manifold comprises a wall disposed about an entire circumference that extends fully around a central axis of the manifold, and the plurality of branch connections is circumferentially spaced evenly about the entire first circumference of the manifold.

14. The system of claim 13, wherein the wall of the manifold is annular, and the plurality of branch connections are evenly spaced along a length of the manifold.

15. The system of claim 13, wherein each branch connection of the plurality of branch connections routes a fluid jet of steam into a lumen of the manifold, and a first fluid jet of steam and a second fluid jet of steam impinge within the lumen to create a swirling flow within the manifold.

16. The system of claim 13, wherein each branch connection of the plurality of branch connections comprises a pipe section fixedly coupled to a reinforced connection, and wherein each branch connection of the plurality of branch connections is fixedly coupled to the manifold with the reinforced connection.

17. The system of claim 16, wherein a first diameter of the reinforced connection is greater than a second diameter of the pipe section, and wherein a first wall thickness of the reinforced connection is at least greater than half of a second wall thickness of the manifold.

18. A system for distributing flows in a heat recovery steam generator (HRSG), comprising:
a manifold of the HRSG, wherein the manifold comprises a wall disposed about an entire circumference that extends fully around a central axis of the manifold; and
a plurality of branch connections circumferentially spaced evenly about the entire first circumference of the manifold, wherein the plurality of branch connections comprises at least three branch connections.

19. The system of claim 18, wherein each branch connection of the plurality of branch connections comprises a pipe section fixedly coupled to a reinforced connection, and each branch connection of the plurality of branch connections is fixedly coupled to the manifold with the reinforced connection.

20. The system of claim 19, wherein a first wall thickness of the reinforced connection is at least greater than half of a second wall thickness of the manifold.

* * * * *